Oct. 6, 1959 J. R. PERILHOU 2,907,819

DEVICE FOR THE MAGNETIC RECORDING AND/OR REPRODUCTION OF TELEVISION SIGNALS

Filed June 20, 1955 4 Sheets-Sheet 1

INVENTOR

JEAN ROBERT PERILHOU

BY Fred M. Vogel

AGENT

INVENTOR
JEAN ROBERT PERILHOU
BY Fred M. Vogel
AGENT

INVENTOR
JEAN ROBERT PERILHOU
BY Fred M. Vogel
AGENT

INVENTOR
JEAN ROBERT PERILHOU
BY Fred M. Vogel
AGENT

United States Patent Office 2,907,819

Patented Oct. 6, 1959

2,907,819

DEVICE FOR THE MAGNETIC RECORDING AND/OR REPRODUCTION OF TELEVISION SIGNALS

Jean Robert Perilhou, Bourg la Reine, France, assignor, by mesne assignments, to North American Philips Company, Inc., New York, N.Y., a corporation of Delaware Application June 20, 1955, Serial No. 516,587

Claims priority, application France June 24, 1954

5 Claims. (Cl. 178—6.6)

This invention relates to methods and devices for the magnetic recording and/or reproduction of television signals.

It is known that signals can be recorded on a carrier such as, for example, a magnetic tape passing in front of a recording head, whereupon said signals can be accurately reproduced by a reproducing head without the system becoming very complicated, provided the frequency of signals does not exceed a given practical limit which, in the present state of the art, is approximately 1 megacycle per second.

The usual television signals are comprised in a frequency band of a few hundred cycles per second to several megacycles per second, which consequently does not permit the television signals to be recorded in a simple and direct manner.

The present invention primarily has for its object to construct such magnetic recording devices in such manner as to better fulfil the various practical desiderata and particularly permits television signals to be recorded magnetically in a simple manner by the usual means.

It basically consists in a magnetic device for recording television signals of said type, and in previously converting the signals referred to, by supplying them to at least one electro-optical converter. The picture delivered by said converter is scanned by at least one picture scanner with the aid of a scanning method in which signals are supplied for each scanner, the pass-band of which is smaller than that of the initial television signals and preferably at the most equal to 1 megacycle per second, the signals subsequently being recorded at the output of the scanning tube on a movable recording carrier of the magnetic type.

Apart from this main step, the invention comprises several other measures which will be explained hereinafter.

Figure 1:
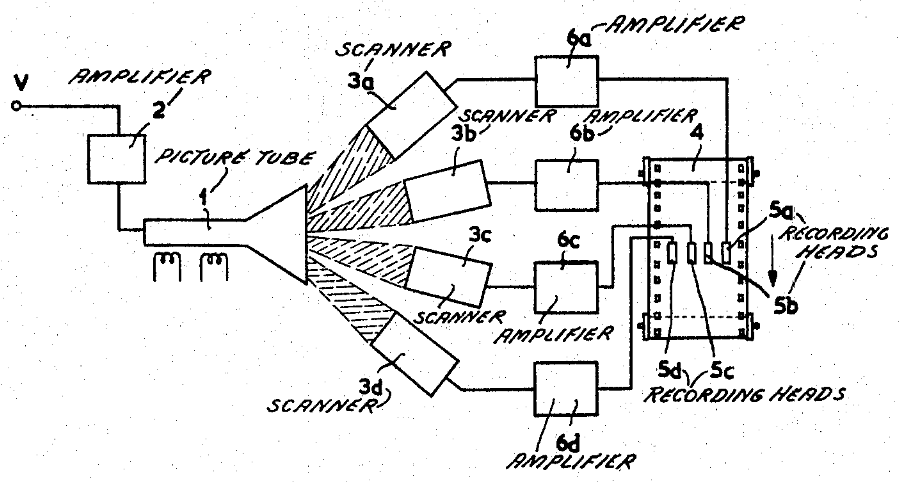
Figure 2:
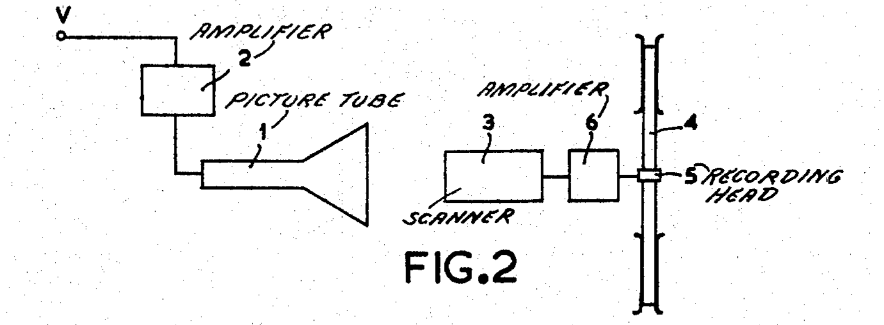
Figure 3A:
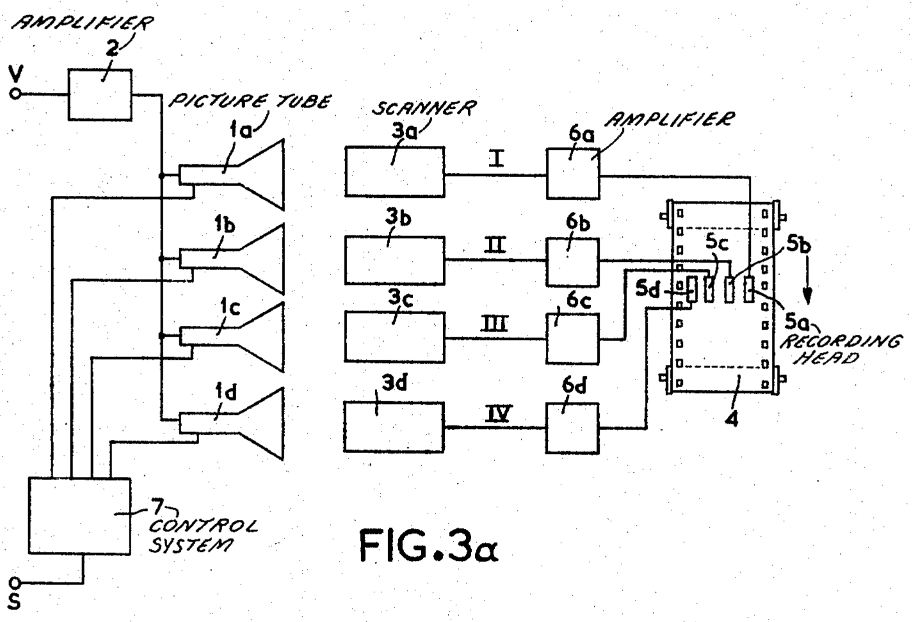
Figure 3B:
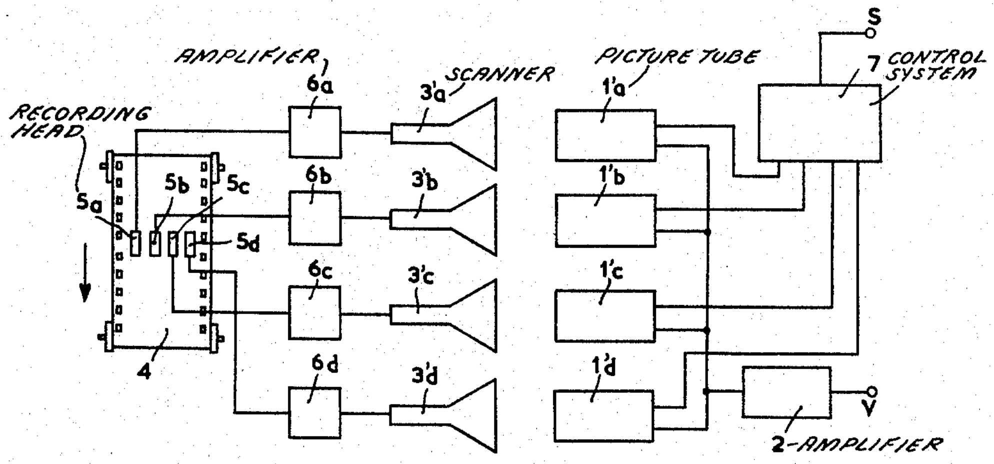
Figure 4:
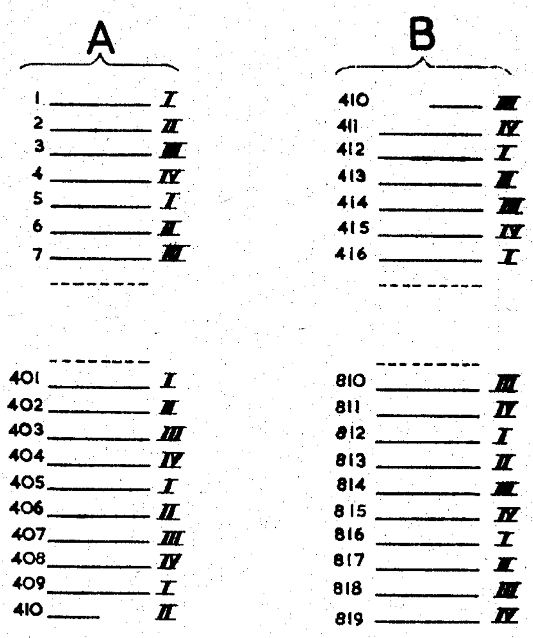
Figure 5:
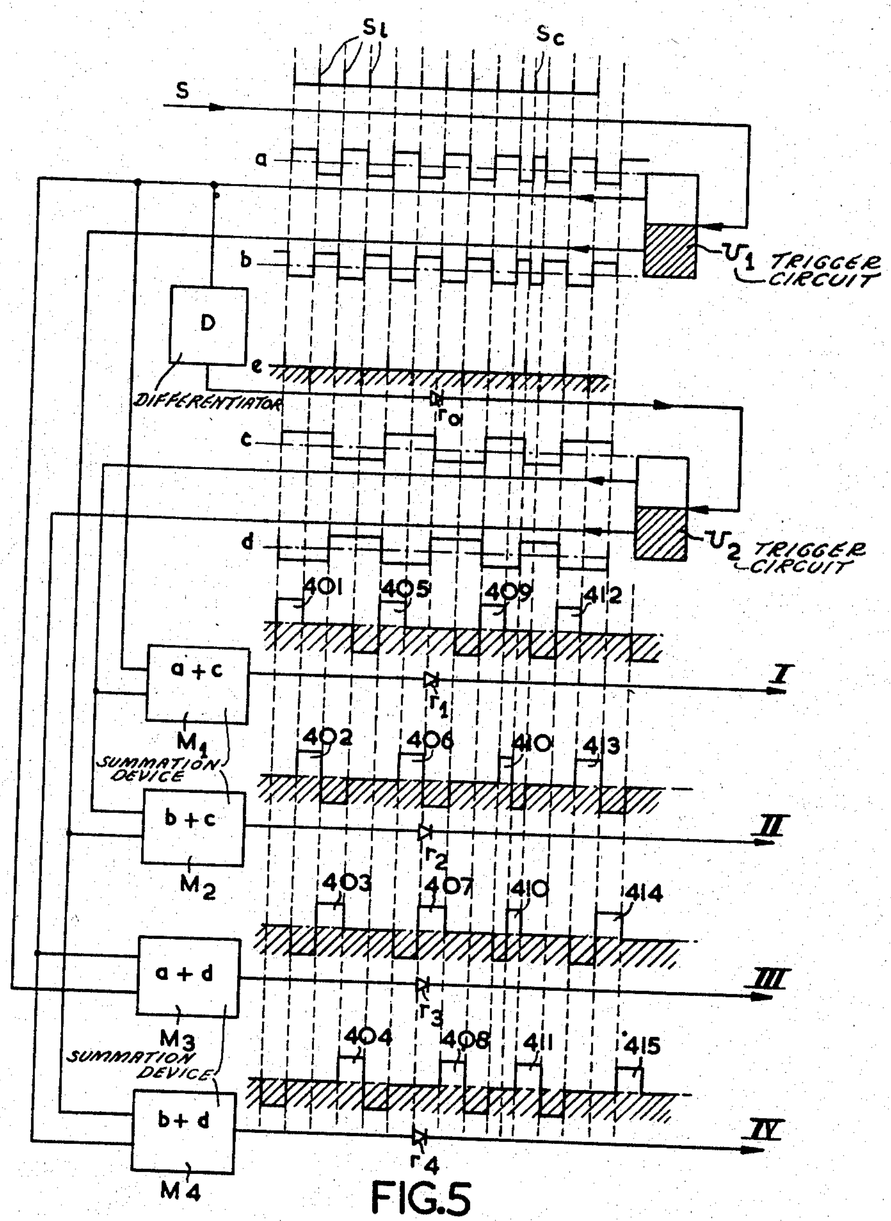

In order that the invention may be readily carried into effect, it will now be described with reference to the accompanying drawing, given by way of example, in which Fig. 1 shows one embodiment of the invention, Fig. 2 shows a second embodiment, Figs. 3*a* and 3*b* show a variant of the embodiment represented in Fig. 1, Fig. 4 shows a line diagram of a television picture according to the French standard, Fig. 5 is a wiring diagram of the commutation of the tubes according to Fig. 3*a* with the standard according to Fig. 4.

In accordance with the invention, it is proposed to effect conversion of the standard picture information to information suitable for proper magnetic recording, that is to say that starting with a given television standard with a given number of lines per picture and pictures per second said standard, which is considered high, is converted into at least one and preferably a plurality of lower standards, that is to say with a number of lines or a picture frequency or, in general, a product (number of lines per picture) $x$ (picture frequency) lower than that of the standard which is considered high.

Fundamentally, the sum of the signals in the low standards should correspond to the signals in the high standard, at least the viewer observing the information obtained from the magnetic recording (single or multiple) should not perceive possible discontinuities. Each signal of corresponding lower standard, due to the lower value of said product, with a smaller frequency passband (of the order of 1 megacycle per second at the most, as stated above) can be recorded without any difficulty on a magnetic carrier in the conventional manner. Let, for example, $n$ recordings be made which, according to one feature of the invention, are advantageously made on a common carrier, the $n$ sound tracks being arranged adjacent one another. The $n$ signals are subsequently read and their sum yields the high norm concerned.

From the further description it will be clear that a single recording instead of $n$ recordings is sufficient, but primarily the invention aims at converting the standard by means of at least one cathode-ray tube or other electro-optical converter, on the screen of which the picture of higher standard is produced, and at least one pick-up tube scanning said picture with a different standard.

Based on the aforesaid principle, several embodiments are possible, which will hereinafter be explained with reference to the drawings.

In Fig. 1, the surface of a picture (supplied by picture tube 1 which is fed with video-signals via an amplifier 2) is divided into $n$ faces adjacent each other (in the drawing $n=4$). Each of said $n$ faces is projected by means of a suitable optical system (not shown) onto the photo-cathode of an iconoscope 3*a*, 3*b*, 3*c*, 3*d* or other picture scanner. Since the picture supplied by tube 1 has N lines, it will be obvious that, in order to maintain the same definition, $$\frac{N}{n}$$

lines per picture scanner are sufficient, the picture frequency remaining unchanged, whilst the scanning in the scanning tubes may be effected $n$-times as slowly. On the other hand the time constant of the phosphors of the picture tubes and/or the time constant of the pick-up tubes, for example of the supericonoscope type, should be sufficient. The video-signals, the pass-band of which is reduced in the ratio $n$, are separately recorded in parallel tracks on a magnetic film 4 by means of recording heads 5*a*, 5*b*, 5*c* and 5*d* respectively which are preferably supplied via amplifiers 6*a*, 6*b*, 6*c* and 6*d* respectively, if required.

In order to regain the complete video-signal, the $n$-tracks of the tape are read simultaneously and form $n$ partial pictures produced on $n$ picture tubes, which pictures, when recombined by optical means, form a complete image on the photo-cathode of a pick-up tube scanned according to the high standard. The diagram is again the diagram shown in Fig. 1, with the exception that the signals occur in inverse sense, and also the tubes 3*a*, 3*b*, 3*c*, 3*d* on the one hand and the tube 1 on the other hand are of inverse type (the first-mentioned tubes becoming cathode-ray tubes, the second becoming an iconoscope, for example).

In a second embodiment shown in Fig. 2, in which the luminescent screen of tube 1, where the high standard picture is formed, is scanned according to the rules of said standard, said picture is subsequently projected on the photo-cathode of a pick-up tube 3 which is scanned with the same number of lines but a lower picture frequency, at any rate compatible with the reproduction of motion, since the time constants of the phosphors are chosen accordingly. If, for example, the high standard has a picture frequency of 50 per second, a frequency of the order of 12.5 per second may be chosen for the low standard.

The signal of smaller pass-band which is supplied by the pick-up apparatus 3, is recorded on the magnetic tape 4 by usual means, if desired via an amplifier 6.

The reading occurs in the reverse sense, as in the preceeding instance. The eye of the viewer does not perceive that the signals are less complete than the initial signals.

The present invention is, of course, not limited to the embodiments referred to, but comprises all variants thereof. Particularly, in the embodiment shown in Fig. 1, provision may advantageously be made of an arrangement in which the four partial images are interlaced, that is to say that the scanning tubes 3*a* to 3*d*, scan, each in turn, a line of the picture of high definition at a velocity four times as low as that at which the picture is formed on the screen of the tube 1. Alternatively (Fig. 3) the number of cathode-ray tubes 1*a*, 1*b*, 1*c*, 1*d* may be chosen to correspond to that of the pick-up tubes. A suitable control system 7 permits only one line in four to be traced on the screen of said cathode-ray tubes, the lines of one tube being displaced with respect to those of the following tube. In this manner, a picture of high definition along a line and of low definition in the vertical direction is instantly produced on each of the *n* tubes, which picture is scanned with a low standard by the associated pick-up tube 3*a*, 3*b*, 3*c* and 3*d*. Each group (1*a*, 3*a*) . . . (1*d*, 3*d*) may be combined to form an electro-optical unit and even a single particular tube. In reproduction (Fig. 3*b*) a pick-up tube 1'*a*, 1'*b*, 1'*c*, 1'*d* may similarly be used for each picture tube 3'*a*, 3'*b*, 3'*c*, 3'*d*, scanned with a low standard (or units combined in the manner referred to above). The pick-up tubes are scanned with a high standard but only with one line in every *n* line by means of the control member 7.

Moreover, it is possible to incorporate in the embodiments shown in Fig. 1 or its variants, for example that shown in Fig. 3, the principle illustrated in Fig. 2, that is to say reduction of the recorded band by reducing the picture frequency in the tube scanner or in the part of an aforesaid electro-optical unit used for scanning the picture for magnetic recording.

Based on the following, several variants of details are possible.

The pictures produced on the screens of tubes such as 1*a*, 1*b*, 1*c*, 1*d* are not intended to be observed by a viewer, but solely to be scanned by the corresponding tube in order to be recorded and subsequently restituted. Consequently, they need only have sufficient definition for this tube. Hence, they should permit extension in height or any suitable electronic or optical trans-position. The picture may have the colour which is most suitable for the scanning tube and need not be visible. If the tubes are of the supericonoscope type, scanning of the photocathode will preferably be effected by means of an auxiliary flying-spot.

The devices in accordance with the invention may be used in colour television by separating the fundamental chromatic components, which are preferably recorded individually.

However, one difficulty remains e.g. in the variant shown in Fig. 3*a*, which resides in the nature of the television standard. If this standard comprises a number of lines non-divisible by the number of magnetic tracks, it will be evident that the commutation controlled by the member 7 will be difficult to effect. By way of example, the French television standard using 819 interlaced lines for successive pictures will be considered.

Fig. 4 shows diagrammatically the distribution of the lines in two successive interlaced fields A and B, the lines numbered 1, 2, 3 . . . being successively associated with the paths I, II, III, IV. The 409th line of the field A is associated with the path I, one half of the 410th line of said field is associated with the path II, and the other half, associated with field B, pertains to the path III. Further, the line 411 of the field B is associated with the path IV, the line 412 to the path I and so on. All the commutations are controlled by the synchronisation signals associated with said lines.

The device used for this purpose may, for example, be that shown in Fig. 5. It is known that with the French standard, in respect of the synchronisation signals, there are regularly recurring pulses *s*, for the line synchronisation signals, between which pulses a supplementary pulse $S_c$ occurs for the interlacing at the end of a field of type A, whereas no such pulse occurs at the end of a field of type B. Said signals *s* are consequently represented in function at the time which is supposed to elapse from left to right. They are applied to the inlet of an electronic trigger-circuit $U_1$, which at its two outlets supplies signals *a* and *b* also represented in function of time, in conformity with the signals S. The signals *a* enter a member D which differentiates them and consequently supplies the signals *e*, only the signals of one polarity being conserved, for example by means of a rectifier $r_0$. These signals are supplied to a second trigger-circuit $U_2$ which supplies at its outlets signals *c* and *d* respectively. Adding devices $M_1$, $M_2$, $M_3$, $M_4$ permit the signals $a+c$, $b+c$, $a+d$ and $b+d$ to be added respectively. At the outlets of the adding devices, pulses are obtained, for example, by means of rectifiers $r_1$, $r_2$, $r_3$, $r_4$, which each in turn permit the tubes 1*a*, 1*b*, 1*c*, 1*d* shown in Fig. 3*a* to be made conductive for the successive lines of the picture. It is found that said tubes are thus regularly and successively connected until intervention of the picture and impulse which yields two pulses of only one half period relative to the others, which make paths II and III conductive as is required vide Fig. 4. The pulses shown in Fig. 5 are numbered 402, 403 and so on, according to the same numbers of corresponding lines. It is to be understood that device shown in Fig. 5 is represented diagramatically and particularly the polarities of the signals and the choice of the trigger circuits and of the differentiating devices and rectifiers should be in harmony with one another, whilst several variants, notably in the case of a different number of paths, is possible without departing from the spirit of the invention.

Alternatively, if the recorded picture is only to be made visible without distance transmission, it is sufficient to supply the signals, derived from the recorded tracks in the aforesaid manner to a unit of suitable electro-optical converters comprising an optical system in order that their different pictures may be fused into a single picture observed by the viewer, without it being necessary to retake these pictures by means of one of more scanners.

What is claimed is:

1. Apparatus for magnetically recording and reproducing a television image signal having a given frequency bandwidth, comprising means for displaying an image in accordance with said signal, a plurality of scanning devices each positioned to scan a portion of said image, said means and said plurality of scanning devices together acting to convert said signal into a plurality of signals each having a frequency bandwidth less than said given bandwidth, means for simultaneously magnetically recording said plurality of signals, pick-up means for simultaneously reproducing said magnetically recorded signals, and means for combining said reproduced signals to reconstruct said image signals.

2. Apparatus as claimed in claim 1, in which said means for displaying an image displays a complete picture image, and in which said scanning devices each scan a different area of said complete picture image.

3. Apparatus as claimed in claim 1, in which said means for displaying an image comprises a plurality of image display devices each connected to display a different portion of the total image, and in which said scanning devices are respectively positioned to scan individual ones of said image display devices.

4. Apparatus as claimed in claim 3, in which said image display devices display interlaced portions of the total image.

5. Apparatus as claimed in claim 3, in which said means for combining the reproduced signals comprises a plurality of image display devices respectively connected to receive said reproduced signals, a plurality of scanning pick-up devices respectively positioned to scan the respective ones of said last-named image display devices, and means connected to combine the output signals of said scanning pick-up devices.

References Cited in the file of this patent

UNITED STATES PATENTS

| | | |
|---|---|---|
| 1,771,360 | Thurm | July 22, 1930 |
| 1,974,911 | Buecker | Sept. 25, 1934 |
| 2,219,149 | Goldsmith | Oct. 22, 1940 |
| 2,275,224 | Henroteau | Mar. 3, 1942 |
| 2,281,405 | Barrish | Apr. 28, 1942 |
| 2,293,899 | Hanson | Aug. 25, 1942 |
| 2,335,864 | Lang | Dec. 7, 1943 |
| 2,517,808 | Sziklai | Aug. 8, 1950 |

FOREIGN PATENTS

| | | |
|---|---|---|
| 717,924 | France | Oct. 26, 1931 |